United States Patent [19]
de Garis et al.

[11] Patent Number: 5,826,248
[45] Date of Patent: Oct. 20, 1998

[54] NEURONIC CELLULAR AUTOMATON AND OPTIMIZER EMPLOYING THE SAME

[75] Inventors: Hugo R. de Garis; Hitoshi Hemmi, both of Kyoto, Japan

[73] Assignee: ATR Human Information Processing Research Laboratories, Kyoto, Japan

[21] Appl. No.: 316,499

[22] Filed: Sep. 30, 1994

[30] Foreign Application Priority Data

Oct. 6, 1993 [JP] Japan .................................... 5-250677

[51] Int. Cl.⁶ ............................... G06E 1/00; G06E 3/00
[52] U.S. Cl. .................................. 706/15; 706/19; 706/26
[58] Field of Search .................................. 382/155–159; 395/20–27; 364/578, 748

[56] References Cited

U.S. PATENT DOCUMENTS

| 4,751,665 | 6/1988 | Cappelo et al. | 364/748 |
| 4,809,202 | 2/1989 | Wolfram | 364/578 |
| 5,140,670 | 8/1992 | Chua et al. | 395/24 |
| 5,355,528 | 10/1994 | Roska et al. | 395/24 |
| 5,371,834 | 12/1994 | Tawel | 395/23 |

OTHER PUBLICATIONS

Hameroff et al, "Cytoskeletal conformational Automata: Intra–neuronal support of neural networks"; 1992 IEEE International Conference onf Systems, Man and Cybernetics, pp. 84–88 vol. 1, Oct. 1992.

de Garis, "CAM–BRAIN the evolutionary . . . (CAM)"; Second International Symposium on Neuroinformatics and Neurocomputers, pp. 62–69, Sep. 1995.

Fukumoto et al, "Template design of cellular neural networks . . . counting"; Communications on the Move. Singapore. ICCS/ISITA '92, pp. 1240–1246 vol. 3, Nov. 1992.

New Generation Computing, vol. 12, No. 2, 1994, Berlin DE, pp. 215–221, De Garis—An artificial brain ATRs CAM–Brain project aims to build/evolve an artificial brain with a million neural net modules inside a trillion cell cellular automata machine, *the whole document*.

European Conference on Artificial Life ECAL93, vol. 1, 24 May 1993, Brussels, Belgium, pp. 274–284, De Garis 'Evolving a replicator: the genetic programming of self reproduction in cellular automata', * the whole document*.

Proceedings of the Winter Simulation Conference, ACM, 14 Jan. 1974, Washington, USA, pp. 449–459, Wainwright 'Life is universal', *p. 454, left col., line 1–p. 459, left col., line 21; figures 15–21*.

Physica D, vol. 45, 1990, Amsterdam NL, pp. 205–207, Victor 'What can automation theory tell us about the brain', *p. 205, left col., line1–right col., line 30*.

Physica D, vol. 10, 1984, Amsterdam NL, pp. 135–144, Langton 'Self–reproduction in cellular automata', *the whole document*.

"Cellular Automata", E.F. Codd, Academic Press, Inc., 1968.

Primary Examiner—Tariq R. Hafiz
Attorney, Agent, or Firm—McDermott, Will & Emery

[57] ABSTRACT

A cellular automaton part is provided with cellular automata each including a plurality of cells. Each cell is provided with a growth period state deriving circuit for growing a cell column and a stable period state deriving circuit for stabilizing the cell column. An input/output part carries out input/output in/from the cellular automata in relation to a target problem, and outputs the same also to an evaluation part. The evaluation part operates the degrees of application of the cellular automata with respect to the target problem, so that an evaluation reflecting part decides next initial states of the cellular automata and operations of the growth period and stable period state deriving circuits on the basis of evaluation values of the evaluation part.

6 Claims, 16 Drawing Sheets

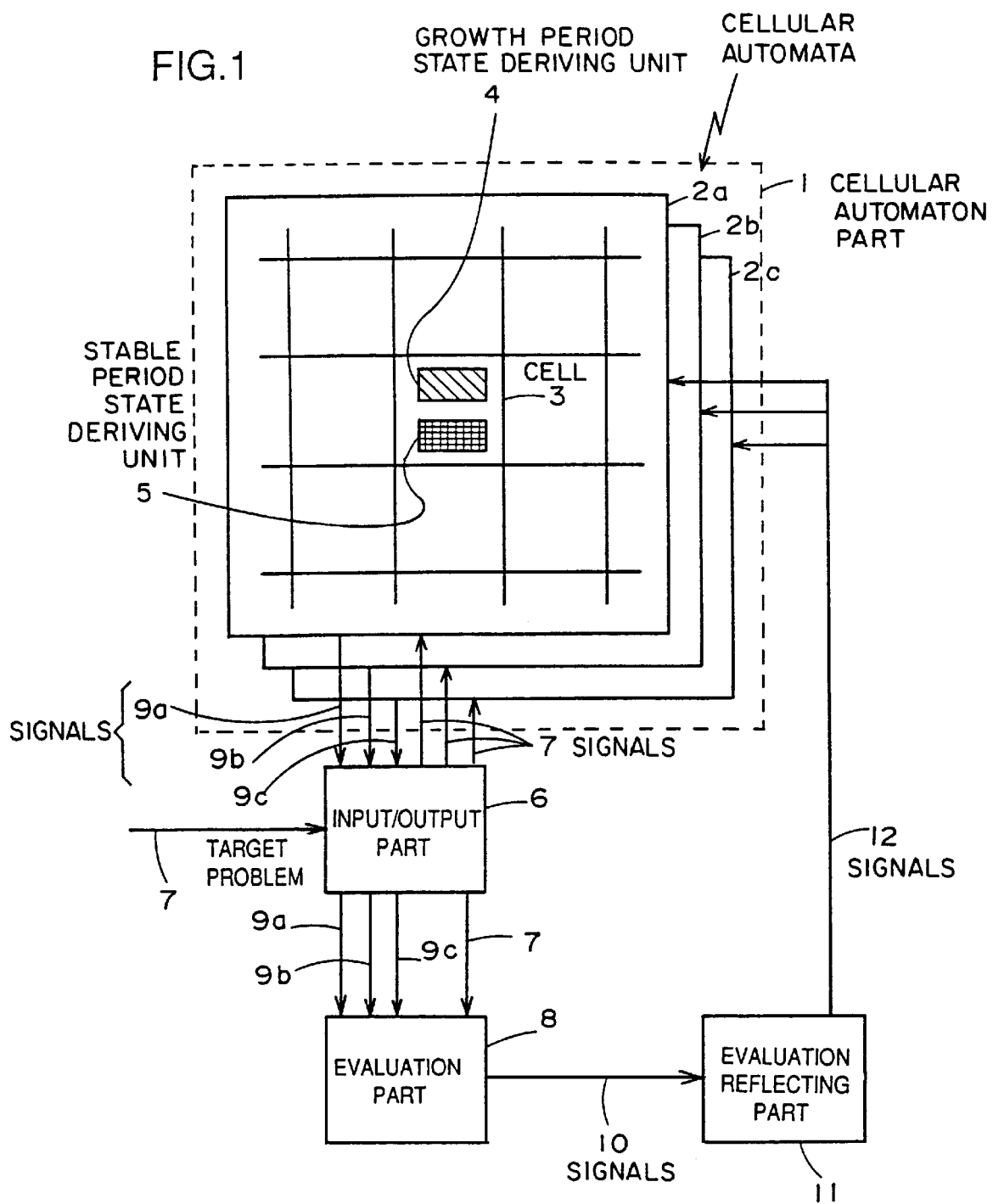

CTRBL -> Cnext 9.18.16.11.5 -> 4

21 FORWARD END PORTION

FIG.9A

| 2 | 2 | 2 | 2 |   |
|---|---|---|---|---|
| 1 | 3 | 8 | 1 | 2 |
| 2 | 2 | 2 | 2 |   |

FIG.9B

| 2 | 2 | 2 | 2 |   |
|---|---|---|---|---|
| 7 | 1 | 3 | 8 | 2 |
| 2 | 2 | 2 | 2 |   |

FIG.9C

| 2 | 2 | 2 | 2 |   |
|---|---|---|---|---|
| 3 | 7 | 1 | 3 | 8 |
| 2 | 2 | 2 | 2 |   |

FIG.9D

| 2 | 2 | 2 | 2 | 11 |   |
|---|---|---|---|----|---|
| 1 | 3 | 7 | 1 | 3  | 3 |
| 2 | 2 | 2 | 2 | 11 |   |

FIG.9E

|   |   |   |   | 2 |   |
|---|---|---|---|---|---|
| 2 | 2 | 2 | 2 | 1 | 2 |
| 7 | 1 | 3 | 7 | 1 | 2 |
| 2 | 2 | 2 | 2 | 1 | 2 |
|   |   |   |   | 2 |   |

FIG.10A

|   |   |   |   |   |
|---|---|---|---|---|
| 2 | 2 | 2 | 2 |   |
| 1 | 3 | 9 | 1 | 2 |
| 2 | 2 | 2 | 2 |   |

FIG.10B

|   |   |   |   |   |
|---|---|---|---|---|
| 2 | 2 | 2 | 2 |   |
| 7 | 1 | 3 | 9 | 2 |
| 2 | 2 | 2 | 2 |   |

FIG.10C

|   |   |   |   |   |
|---|---|---|---|---|
| 2 | 2 | 2 | 2 |   |
| 3 | 7 | 1 | 3 | 9 |
| 2 | 2 | 2 | 2 |   |

FIG.10D

|   |   |   |   |    |
|---|---|---|---|----|
| 2 | 2 | 2 | 2 | 11 |
| 1 | 3 | 7 | 1 | 3 | 11 |
| 2 | 2 | 2 | 2 | 2  |

FIG.10E

|   |   |   |   |   |   |   |
|---|---|---|---|---|---|---|
|   |   |   |   | 2 |   |   |
|   | 2 | 2 | 2 | 2 | 1 | 2 |
| 2 | 1 | 3 | 7 | 1 | 1 | 2 |
|   | 2 | 2 | 2 | 2 | 2 | 2 |

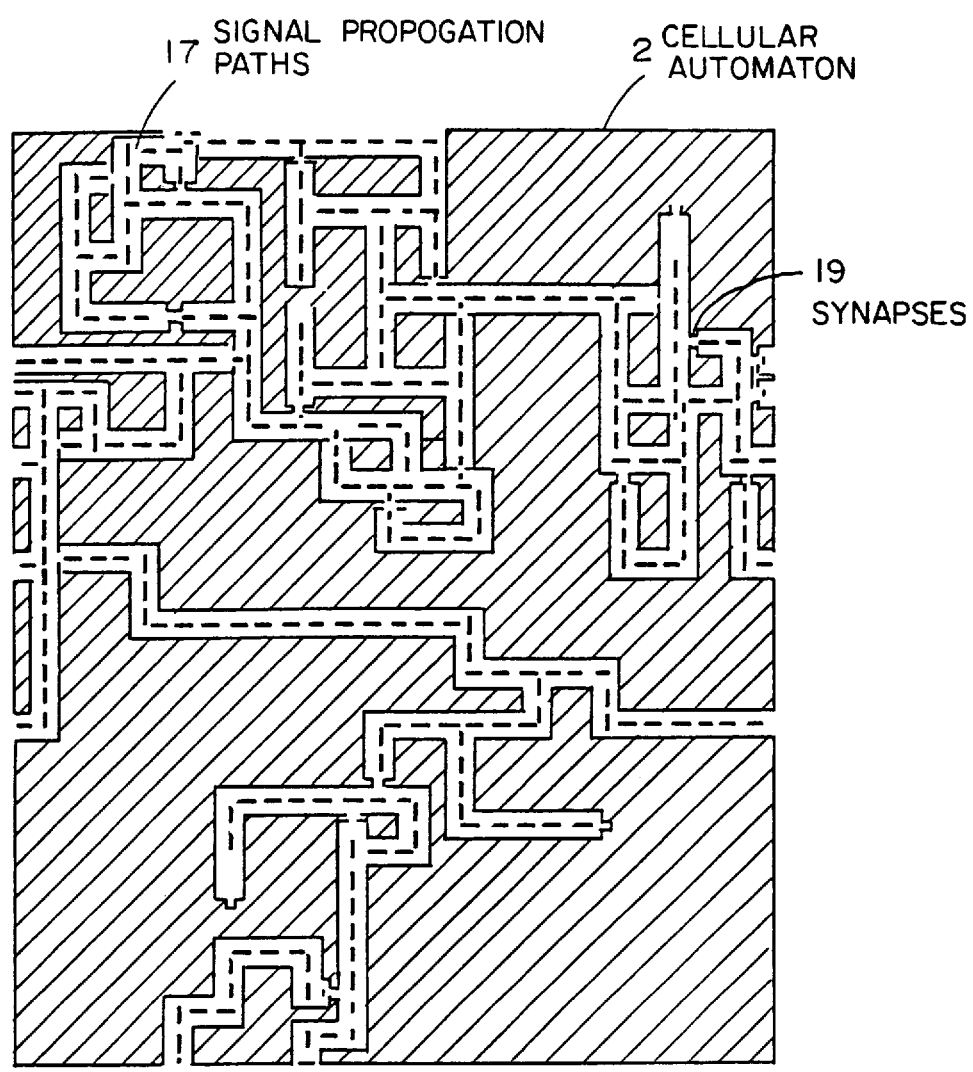

NEURONIC CELLULAR AUTOMATON AND OPTIMIZER EMPLOYING THE SAME

BACKGROUND OF THE INVENTION

1. Field of the Invention

The present invention relates to a neuronic cellular automaton and an optimizer employing the same. More specifically, it relates to a neuronic cellular automaton formed by a simply produced repeating structure, which can flexibly change the number of neurons, presence/absence of connections between the neurons and connection weights in response to problems, and an optimizer employing the same.

2. Description of the Background Art

The technique of information processing employing an artificial neural network has been developed in recent years. The artificial neural network (hereinafter simply referred to as a neural network) is formed by connecting a number of neurons which are units for carrying out simple and uniform information processing, in simulation of a cerebral neural network.

FIGS. 16 and 17 illustrate hierarchical and interconnecting neural networks, which are examples of conventional neural networks respectively.

The hierarchical neural network shown in FIG. 16 includes a first layer 31, a second layer 33 and a third layer 35, which include neurons 32$a$, 32$b$ and 32$c$, neurons 34$a$ to 34$h$ and a neuron 36 respectively. Each of the neurons 32$a$, 32$b$ and 32$c$ provided in the first layer 31 is connected with the respective ones of the neurons 34$a$ to 34$h$ provided in the second layer 33. Each of the neurons 34$a$ to 34$h$ provided in the second layer 33 is connected with the neuron 36 provided in the third layer 35.

Referring to FIG. 16, numeral 37 denotes connections increasing outputs when inputted signals are large, numeral 38 denotes connections suppressing outputs when inputted signals are large, and symbols $w_1'$ to $w_8'$ denote connection weights between the neurons 34$a$ to 34$h$ provided in the second layer 33 and the neuron 36 provided in the third layer 35.

Due to the aforementioned structure, respective signals $x_1$, $x_2$ and $x_3$ which are received in the neurons 32$a$, 32$b$ and 32$c$ of the first layer 31 are inputted in the neuron 36 of the third layer 35 through the neurons 34$a$ to 34$h$ of the second layer 33, to be converted to a signal y and outputted from the neuron 36. The hierarchical neural network shown in FIG. 16 is employed as a learning mechanism with exercises, for example.

On the other hand, the interconnecting neural network shown in FIG. 17 is formed by interconnecting neurons 40$a$, 40$b$ and 40$c$ comprising functions $f_1$, $f_2$, ... $f_n$ respectively. This interconnection is so made that an output of the neuron 40$a$ comprising the function $f_1$ is inputted in respective ones of the neurons including the neuron 40$a$ itself, for example. The functions $f_1$, $f_2$, ..., $f_n$ are expressed as follows, for example:

$$f_1 = c_{11}x_1 + c_{12}x_2 + \ldots c_{1n}x_n$$

$$f_2 = c_{21}x_1 + c_{22}x_2 + \ldots c_{2n}x_n$$

$$f_n = c_{n1}x_1 + c_{n2}x_2 + \ldots c_{nn}x_n$$

where $c_{11}$ etc. represent parameters.

Due to the aforementioned structure, signals $x_1$, $x_2$, ..., $x_n$ which are inputted in the respective neurons are operated by the functions provided in the respective neurons and outputted, so that the outputs are inputted in the neurons including the original neurons themselves. The interconnecting neural network shown in FIG. 17 is employed as an associative memory mechanism, for example.

In an actual cerebral neural network, axons of respective neurons are developed to generate synapses which are connected with other neurons to transmit signals or change connection strengths at the synapses, to learn or store information. Each of the neural networks shown in FIGS. 16 and 17 simulates this operation, and it is necessary to adjust generation/erasing of connections between the neurons or weights of the connections, in order to learn or store information. In more concrete terms, it is necessary to provide sufficient numbers of neurons, mechanisms for setting presence/absence of connections between neuron pairs and those for adjusting connection weights, which are required for employment as learning or storage units. Therefore, neurons are first formed as components, and then one of the following methods is employed.

In a first method, neuron pairs are connected with each other through switching networks serving as mechanisms for setting presence/absence of connections, with no employment of connection weight adjusting mechanisms. In a second method, table lookup mechanisms using RAMs (random access memories) are employed as connection weight adjusting mechanisms. In this method, it is also possible to set presence/absence of connections since an effect which is equivalent to that in a case of connecting no neurons with each other is attained when connection weights between neurons are zeroed, for example.

In a field requiring such flexibility that a neural network can prove its worth, however, it is difficult to anticipate the degrees of preparation of the aforementioned sufficient numbers of neurons, the mechanisms for setting presence/absence of connections between neuron pairs and those for adjusting connection weights. Therefore, the neural network may conceivably be provided with complete flexibility from the first, while it is necessary to provide the mechanisms for setting presence/absence of connections between the neuron pairs and those for adjusting connection weights between all neurons in this case.

In more concrete terms, this means that the scale of switching networks employed as setting mechanisms for presence/absence of connections are $n^2$ in order while RAMs of table lookup mechanisms which are employed as connection weight adjusting mechanisms are $2^n$ in size every neuron, assuming that n represents the number of the neurons. In this case, the neural network is explosively increased in scale with increase of the neuron number n, and hence it is inevitably necessary to limit the number of connections between the neurons. Thus, it is difficult to ensure sufficient flexibility.

SUMMARY OF THE INVENTION

Accordingly, an object of the present invention is to provide a neuronic cellular automaton, being an element for forming a flexible neural network which can autonomically gain/form a structure and an internal operation of a neural network for implementing supplied tasks or desired functions, and an optimizer employing the same, in order to solve the aforementioned problems.

The present invention is directed to a cellular automaton provided with a plurality of cells which are so interconnected with each other that signals indicating states of nearby cells can be inputted in the respective cells as input signals. Cell columns progressing state propagation signals in the cellular automaton are arbitrarily formed as signal propagation paths, and the cellular automaton includes a state deriving circuit for making the cellular automaton refer to a rule for forming colliding cells of the signal propagation paths as operation parts.

According to the present invention, therefore, it is possible to cause signal propagation between neurons which are formed by cell columns by the state deriving circuit, thereby driving the overall structure as a neural network.

According to a more preferred embodiment of the present invention, the state deriving circuit includes a progress circuit for progressing state propagation signals while directly propagating, deflecting or branching the same from starting points of selected prescribed cells, a holding circuit for holding signal loci of the state propagation signals progressed by the progress circuit as signal propagation paths, and a stop circuit for stopping progress of those of the state propagation signals whose heads collide with the signal propagation paths as held.

According to the more preferred embodiment of the present invention, therefore, it is possible to develop connections between neurons similarly to those in development of an actual cerebral neural network as well as to change the neurons to positions for forming synapses by the progress circuit, the holding circuit and the stop circuit.

According to a further preferred embodiment of the present invention, state deriving unit includes a propagation circuit for adding new signals to the cells in the signal propagation paths as formed thereby propagating the signal loci of the state propagation signals, and a change circuit for changing other state propagation signals by heads of those of the state propagation signals propagated by the propagation circuit in the operation parts as formed.

According to the further preferred embodiment of the present invention, therefore, it is possible to readily change the connection weights between the neurons by the propagation circuit and the change circuit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic block diagram showing an optimizer employing neuronic cellular automata according to an embodiment of the present invention;

FIGS. 9A to 9E are diagrams for illustrating a process of progressing a cell in a vertically branched manner;

FIGS. 10A to 10E are diagrams for illustrating a process of upwardly and rightwardly branching a cell;

FIG. 12 is a diagram showing a state of a neuronic cellular automaton of a development stage, which is driven for a constant period;

DESCRIPTION OF THE PREFERRED EMBODIMENTS

Figure 2A:
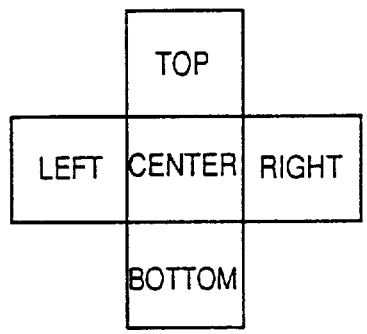
FIGS. 2A and 2B illustrate the principle of state derivation in each cell of the neuronic cellular automata shown in FIG. 1.
Figure 2B:
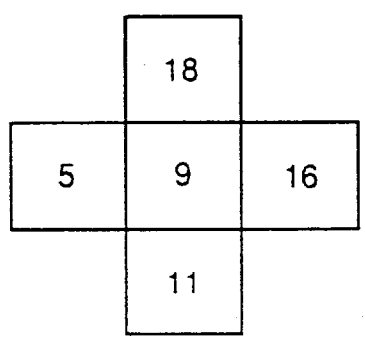
Figure 3:
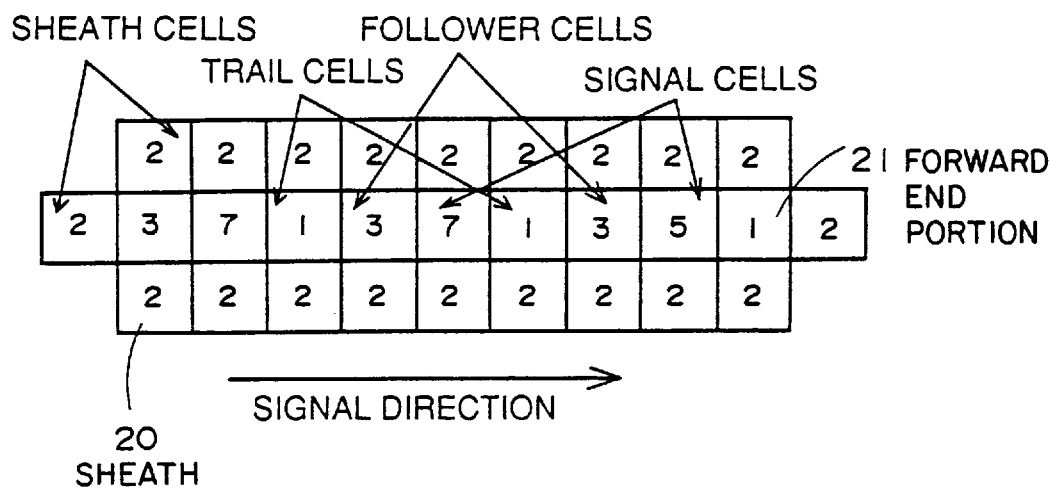
FIG. 3 is a diagram for illustrating a neuron development method.

FIG. 1 is a schematic block diagram showing an optimizer employing neuronic cellular automata according to an embodiment of the present invention, and FIGS. 2A and 2B show the principle of state derivation in each cell of the neuronic cellular automata shown in FIG. 1. In particular, FIG. 2A illustrates the principle of general state derivation, and FIG. 2B illustrates the principle of concrete state derivation. FIG. 3 is a diagram for illustrating a neuron development state.

Referring to FIG. 1, a cellular automaton part (hereinafter referred to as "CA part") 1 is formed by a plurality of, e.g., three cellular automata 2a, 2b and 2c. Respective cells 3 of the cellular automata 2a, 2b and 2c are so interconnected with each other as to receive states of nearby cells as input signals. As shown in FIG. 2A, therefore, a cell expressed as Center can derive its next state by the current state of itself and states of peripheral cells expressed as Top, Left, Right and Bottom. In more concrete terms, a rule is so provided that a next state 4 of the cell Center can be derived by its current state 9 and states 18, 16, 11 and 5 of the cells Top, Right, Bottom and Left, as shown in FIG. 2B. The respective cells 3 are provided with growth period state deriving unit 4 for growing the cells 3 by such a state deriving principle, thereby growing the cellular automata 2a, 2b and 2c. The respective cells 3 are also provided with stable period state deriving means 5 for stabilizing the cellular automata 2a, 2b and 2c after the growth period state deriving means 4 operate for a constant period to grow the cellular automata 2a, 2b and 2c to some extent.

An input/output part 6 is adapted to input a signal 7 indicating a target problem in the respective cellular automata 2a, 2b and 2c which are brought into certain states by the growth period state deriving unit 4 and the stable period state deriving unit 5. To this end, the input/output part 6 receives the signal 7 indicating the target problem and outputs the same to the cellular automata 2a, 2b and 2c, while the same also receives signals 9a, 9b and 9c indicating output results of the cellular automata 2a, 2b and 2c which are responsive to the output signals thereof. An evaluation part 8, which is supplied with the output signals from the input/output part 6, receives the signals 9a, 9b and 9c indicating the output results of the cellular automata 2a, 2b and 2c and the signal 7 indicating the target problem.

The evaluation part 8 operates degrees of application indicating to what degrees the signals 9a, 9b and 9c indicating the output results of the cellular automata 2a, 2b and 2c apply to the target problem, so that signals 10 indicating evaluation values which are the operation results are inputted in an evaluation reflecting part 11 as outputs of the evaluation part 8. The evaluation reflecting part 11 outputs signals 12 indicating next initial states of the respective cellular automata 2a, 2b and 2c based on the received signals 10 indicating the inputted evaluation values and results of decision of next operations of the growth period state deriving unit 4 and the stable period state deriving unit 5, so that the signals 12 are inputted in the cellular automata 2a, 2b and 2c respectively.

The operation is now described. First, the growth period state deriving means 4 grow the respective cells 3, i.e., the cellular automata 2a, 2b and 2c. In this growth process, the respective cellular automata 2a, 2b and 2c develop cell columns corresponding to neuron bodies and axons from cells serving as starting points of respective neurons on the basis of prescribed rules which are referred to by the growth period state deriving unit 4 to rectilinearly propagate, deflect or branch state propagation signals, thereby forming progress loci of the signals as signal propagation paths. In more concrete terms, deflection or branching takes place when a signal cells of a state 5 or 7 reaches a forward end portion 21 among state propagation signals which are propagated through a sheath 20 formed by sheath cells of states 2 along arrow as shown in FIG. 3, for example.

Referring to FIG. 3, follower cells of states 3 follow the signal cells, and they serve as rear markers with respect to the signal cells, while trail cells of states 1 serve as front markers with respect to the signal cells. Therefore, neither deflection nor branching takes place when any follower cell of the state 3 or any trail cell of the state 1 reaches the forward end portion 21.

Each growth state deriving unit 4 includes progress means and holding means.

Figure 4A:
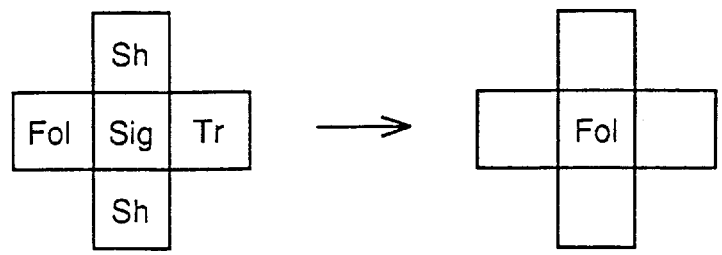
FIGS. 4A to 4D illustrate operations of progress means.
Figure 4B:
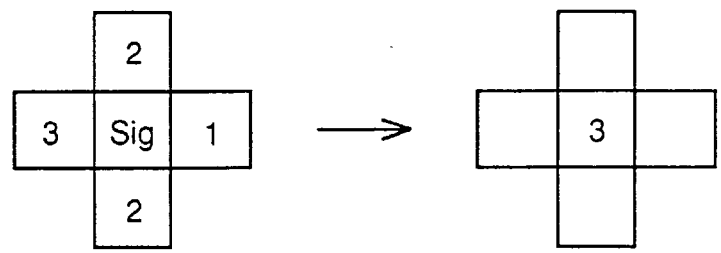

FIGS. 4A to 4D show operations of the progress unit. FIG. 4A shows progress states of five cells appearing in the right end of FIG. 3. The rule is so provided that a follower cell Fol is rightwardly progressed when a sheath cell Sh, a trail cell Tr, another sheath cell Sh and the follower cell Fol are located on top, right, bottom and left sides of a central signal cell Sig. FIG. 4B expresses the rule of FIG. 4A in states 1 to 3, with rightward progress of the follower cell of the state 3.

Figure 4C:
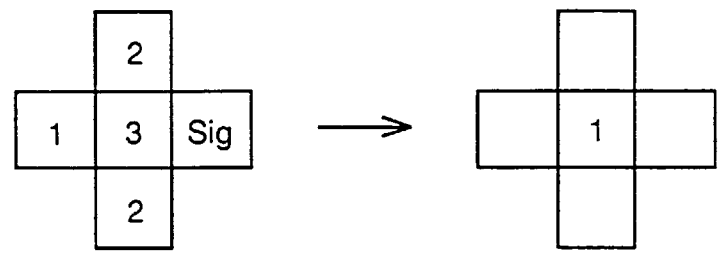
Figure 4D:
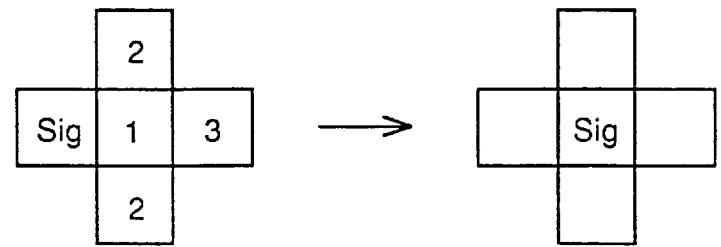

FIG. 4C shows such a rule that the trail cell of the state 1 is rightwardly progressed when the sheath cell of the state 2, the signal cell, another sheath cell of the state 2 and the trail cell of the state 1 are located on top, right, bottom and left sides of the follower cell of the state 3. FIG. 4D shows such a rule that the signal cell is rightwardly progressed when the sheath cell of the state 2, the follower cell of the state 3, another sheath cell of the state 2 and the signal cell are located on top, right, bottom and left sides of the trail cell of the state 1. When a cell other than those set in these rules is progressed, this cell disappears with no rightward progress.

Figure 5A:
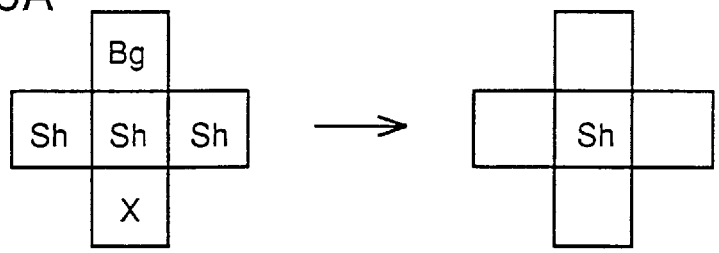
FIGS. 5A to 5E illustrate operations of holding means for holding cells.

FIGS. 5A to 5E illustrate operations of the holding unit for holding the cells. The holding unit holds a central cell when a sheath cell is located at the center with sheath cells located on left and right or top and bottom sides. Namely, the rule shown in FIG. 5A is so provided that the central sheath cell is held when the sheath cells are located at the center and on left and right sides while a background cell and a cell X (signal, follower or trail cell) are located on top and bottom sides respectively.

Figure 5B:
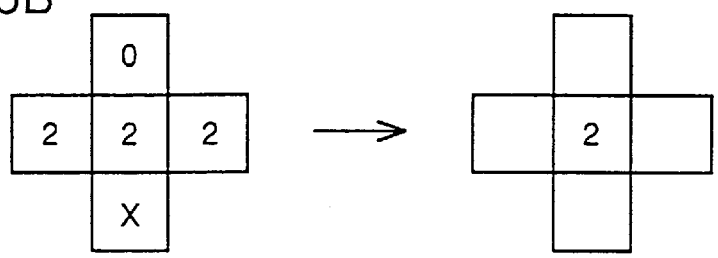
Figure 5C:
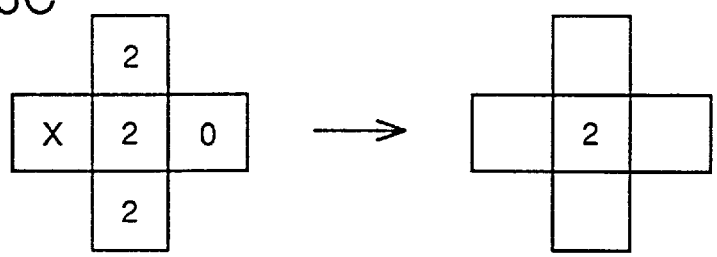
Figure 5D:
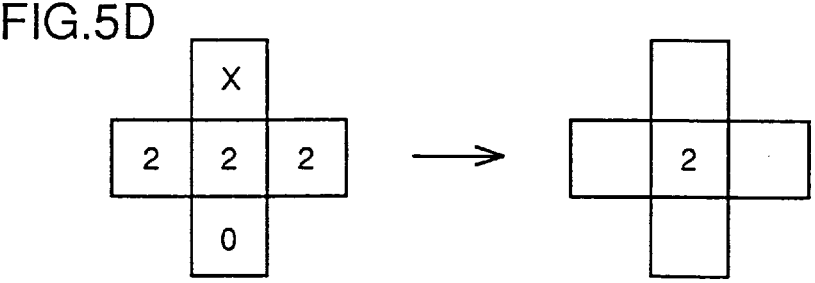
Figure 5E:
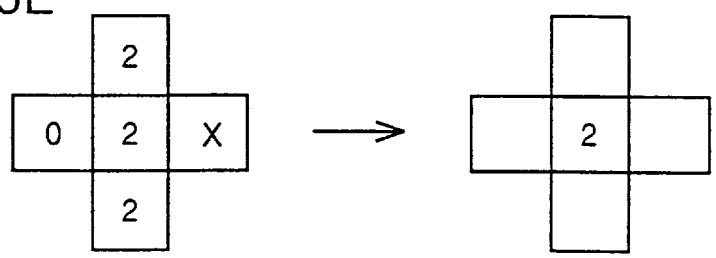

FIG. 5B expresses the rule of FIG. 5A in states 0, 2 and X, and the sheath cell of the state 2 is held in this case. Referring to FIG. 5B, the sheath cells of the states 2 are located at the center and on left and right sides, while the background cell of the state 0 and the cell X are located on top and bottom sides respectively. Referring to FIG. 5C, the sheath cells of the states 2 are located at the center and on top and bottom sides, while the background cell of the state 0 and the cell X are located on right and left sides respectively. Referring to FIG. 5D, the sheath cells are located at the center and on left and right sides, while the cell X and the background cell are located on top and bottom sides. Referring to FIG. 5E, the sheath cells of the states 2 are located at the center and on top and bottom sides, while the cell X and the background cell are located on right and left sides respectively. Also in the respective examples shown in FIGS. 5C to 5E, the rules are so provided that the sheath cell of the state 2 is held.

The aforementioned rules are announced in literature "Cellular Automata" by E. F. Codd, for example.

The growth process includes such a process that, when a head of state propagation signals encounters a propagation path of itself or other signals, propagation of the state propagation signals having the encountering head is stopped so that the encountering cell forms an operation part. In more concrete terms, a synapse is formed when state propagation signals rightwardly progressed through a sheath of states 2 collide with a state propagation path of state propagation signals downwardly progressed through a sheath 22 of states 2, as shown in FIG. 6.

Figure 6:
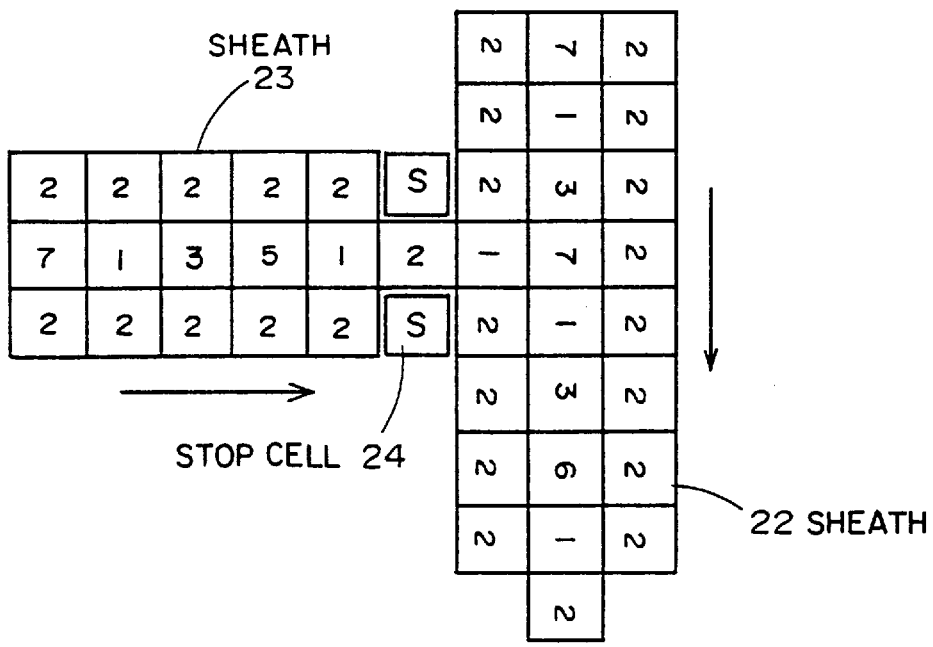
FIG. 6 is a diagram for illustrating a synapse structure.

Referring to FIG. 6, symbol S denotes states of large numbers forming stop means, which are provided for preventing the state propagation signals progressed through a sheath 23 from deflection and branching.

Figure 7A:
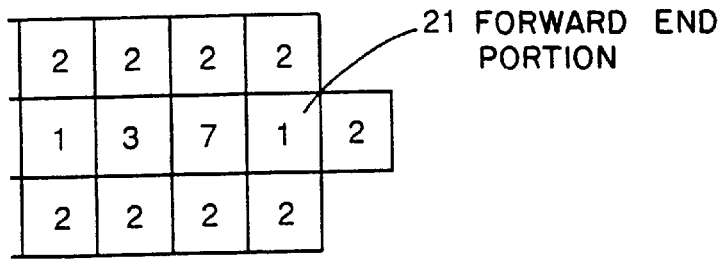
FIGS. 7A to 7D are diagrams for illustrating a process of growing a cell.
Figure 7B:
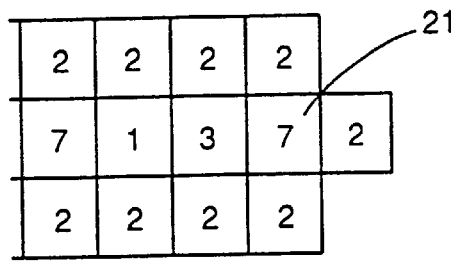
Figure 7C:
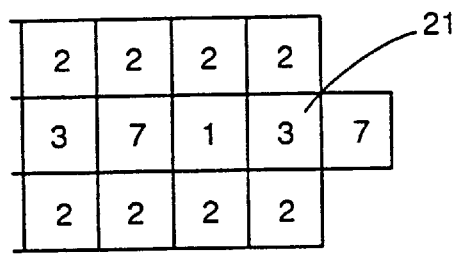
Figure 7D:
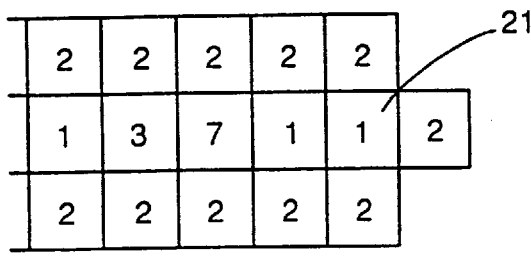

FIGS. 7A to 7D are diagrams for illustrating a cell growth process. When a signal cell of a state 7 reaches a forward end portion 21 as shown in FIG. 7A, a trail cell of a state 1 located on the forward end portion 21 disappears so that the signal cell of the state 7 is progressed to the forward end portion 21 as shown in FIG. 7B, due to conformance to the rule described above with reference to FIG. 4D. The state shown in FIG. 7B conforms to the rule described above with reference to FIG. 4B, whereby the signal cell of the state 7 is rightwardly progressed and a follower cell of a state 3 is progressed to the forward end portion 21, as shown in FIG. 7C. Then, the signal cell of the state 7 is replaced by a trail cell of a state 1 for indicating the direction of progress, and sheath cells of states 2 are added to right, top and bottom sides of the trail cell of the state 1, as shown in FIG. 7D.

Figure 8A:
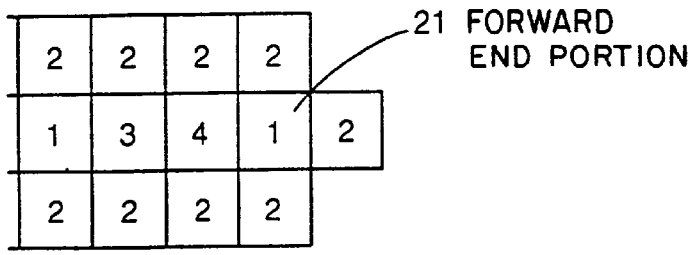
FIGS. 8A to 8E are diagrams for illustrating a process of progressing a cell in a leftwardly deflected manner.
Figure 8B:
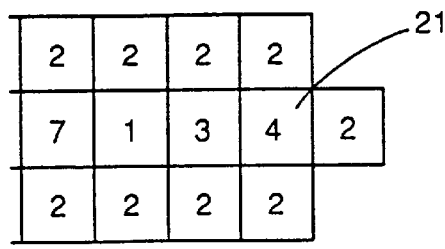
Figure 8C:
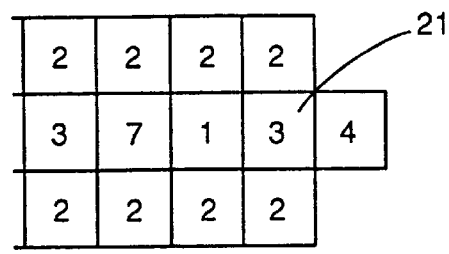
Figure 8D:
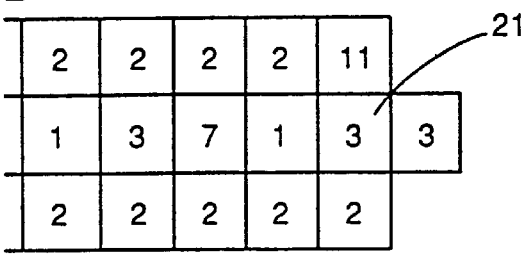
Figure 8E:
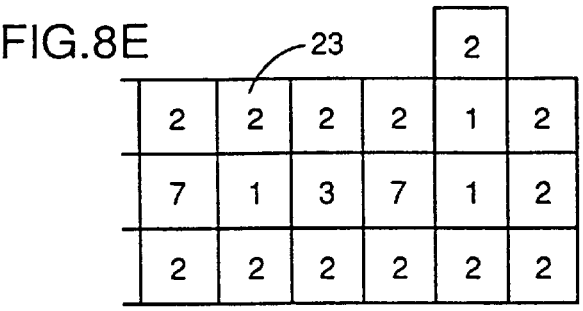

FIGS. 8A to 8E are diagrams for illustrating a leftwardly deflected process with respect to the direction of progress. A signal cell of a state 4 shown in FIG. 8A is rightwardly progressed as shown in FIG. 8B. The rule is so provided that the state 4 is leftwardly deflected, and hence the signal cell of the state 4 which is progressed to a right end portion as shown in FIG. 8C is upwardly deflected as shown in FIG. 8D, to be replaced by a signal cell of a state 11. A follower cell of a state 3 is progressed to the forward end portion 21. When the state propagation signals are further rightwardly progressed through a sheath 23, the follower cell of the state 3 located on the forward end portion 21 is upwardly progressed as shown in FIG. 8E to be replaced by a trail cell of a state 1 for indicating the direction of progress, while the follower cell of the state 3 located on the right end portion is replaced by a sheath cell of a state 2 with addition of sheath cells of states 2 on top and bottom sides thereof.

FIGS. 9A to 9E are diagrams for illustrating a process of vertically branching a cell. A signal cell of a state 8, which indicates branching in FIG. 9A, is progressed as shown in FIGS. 9B and 9C, to be vertically branched into signal cells of states 11. As shown in FIG. 9E, the signal cells of states 11 are replaced by trail cells of states 1 for indicating vertical progress, with addition of sheath cells of states 2 on right ends.

FIGS. 10A to 10E are diagrams for illustrating a process of upwardly and rightwardly branching a cell. A signal cell of a state 9, indicating upward and rightward branching in FIG. 10A, is progressed as shown in FIGS. 10B and 10C to be replaced by signal cells of states 11 and upwardly and rightwardly branched, as shown in FIG. 10D. The signal cells of the states 11 as branched are replaced by trial cells of states 1 for indicating the direction of progress as shown in FIG. 10E, with new addition of sheath cells of states 2.

Figure 11A:
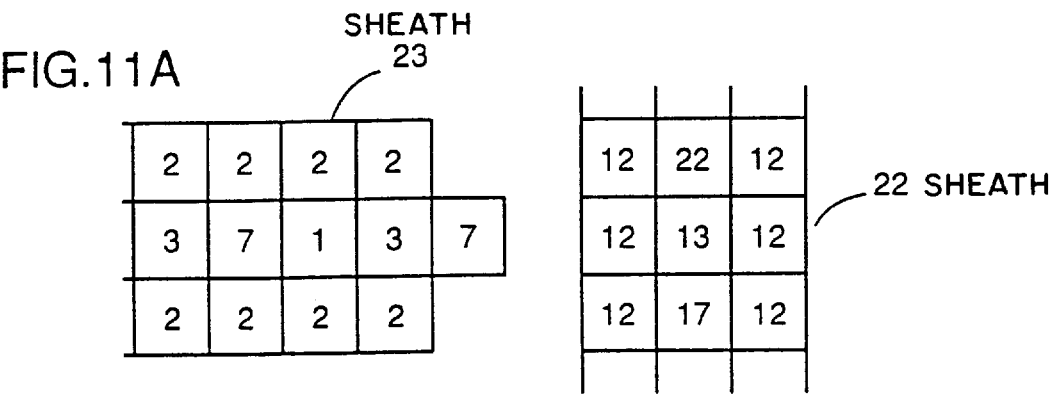
FIGS. 11A to 11C are diagrams for illustrating a process of stopping a head cell encountering another signal propagation path.
Figure 11B:
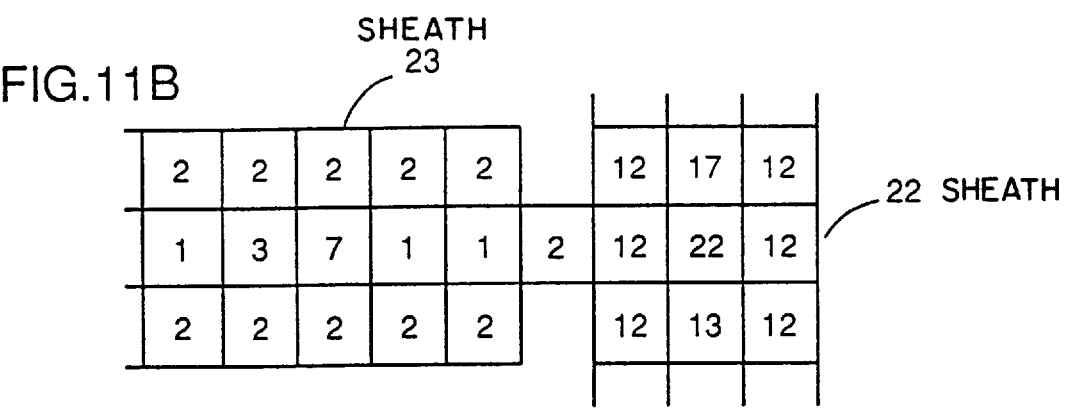
Figure 11C:
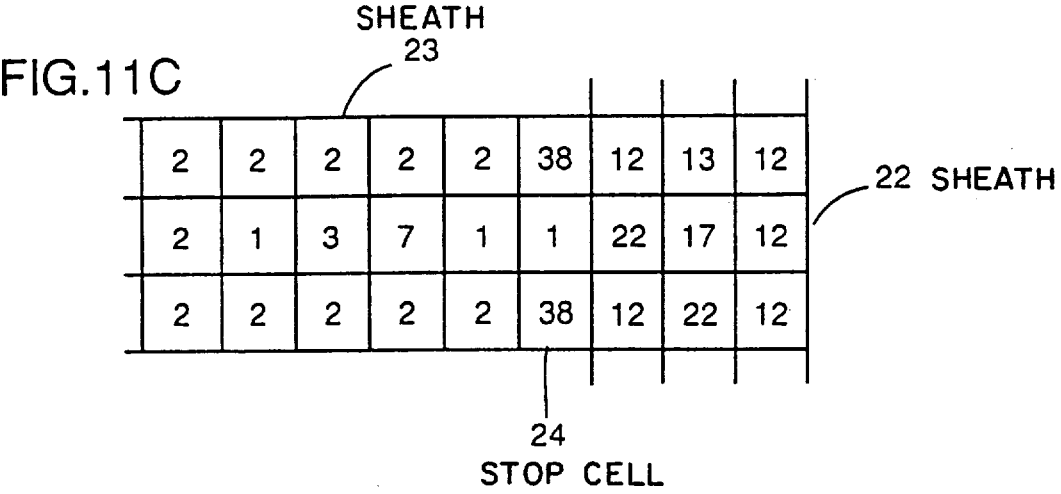

FIGS. 11A to 11C are diagrams for illustrating a process of stopping a head cell encountering another signal propagation path. When the cells are rightwardly progressed through a sheath 23 as shown in FIG. 11A and collide with a downwardly progressed sheath 24 as shown in FIG. 11B, follower cells of states 3 are replaced by trail cells of states 1, with addition of sheath cells of states 2 on top, bottom and right sides. Further, the cells are rightwardly progressed with neither deflection nor branching, and stop cells of states 38 are added for indicating stopping, as shown in FIG. 11C.

FIG. 12 illustrates a state of a neuronic cellular automaton 2, which is in a development stage and driven for a constant period.

After the growth period state deriving unit 4 causing such processes in the cellular automata 2a, 2b and 2c operate for a constant period, neurons having signal loci which are signal propagation paths 7 form synapses 19 in respective portions in the cellular automaton 2 shown in FIG. 12.

Then, the stable period state deriving unit 5 operate for the neurons of these signal loci, to stabilize the cellular automata 2a, 2b and 2c. In the stablizing processes, signals are newly added to starting points of the neurons of the respective signal loci of the cellular automata 2a, 2b and 2c which are grown by the growth period state deriving unit 4, so that the respective signal loci are propagated to head sides. In the cells forming synapses, therefore, head signals of the colliding signal propagation paths increase or decrease the signals of the signal loci. Therefore, the cells in which the signal propagation paths collide with each other have functions for serving as change means by the growth period state deriving unit 4.

Figure 13A:
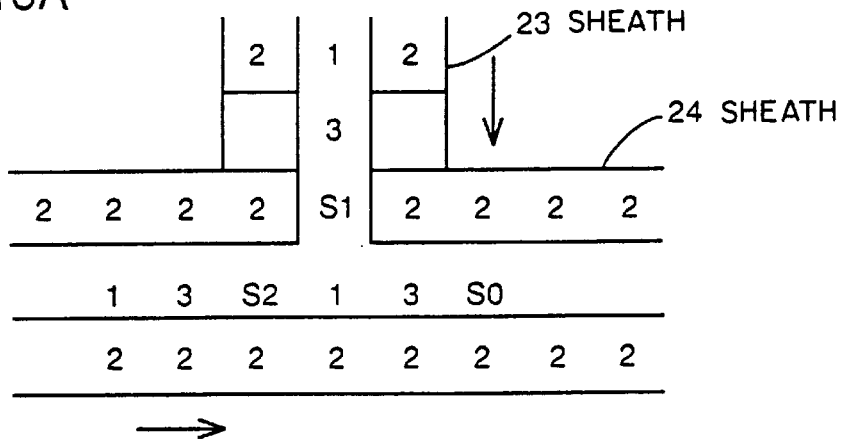
FIGS. 13A to 13D are diagrams for illustrating an operation of change means.
Figure 13B:
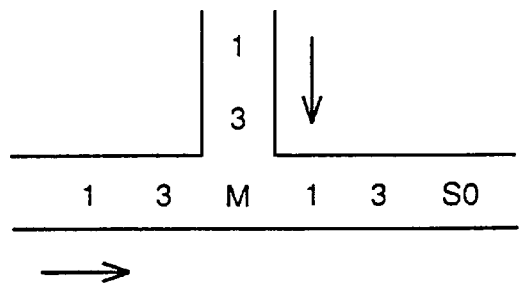
Figure 13C:
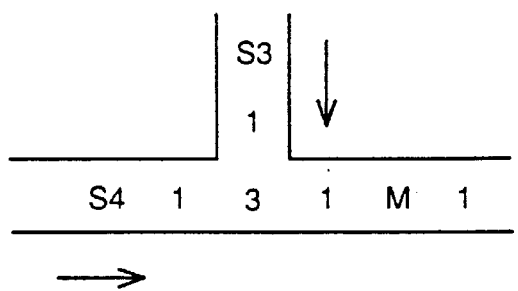
Figure 13D:
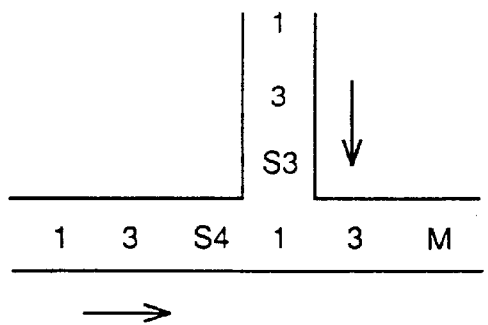

FIGS. 13A to 13D are diagrams for illustrating the operation of each change means. Assuming that a propagation path of a sheath 23 collides with that of a sheath 24 in FIG. 13A, a cell S1 which is progressed from the sheath 23 changes a cell S2 which is progressed through the sheath 24 to a cell M, as shown in FIG. 13B. When the cells are further progressed through the sheaths 23 and 24, the cell M is changed to a cell of a state 3 as shown in FIG. 13C by two cells of states 3 shown in FIG. 13B, so that two cells of states 1 are progressed through the sheath 24 as shown in FIG. 13D.

On the other hand, the input/output part 6 starts its operation simultaneously with the stable period state deriving unit 5. In other words, the input/output part 6 outputs the signal 7 indicating the target problem to the respective cellular automata 2a, 2b and 2c and receives the signals 9a, 9b and 9c indicating the output results from the cellular automata 2a, 2b and 2c in response thereto during operations of the stable period state deriving unit 5. The input/output part 6 also outputs the signals 9a, 9b and 9c indicating the output results from the cellular automata 2a, 2b and 2c and the signal 7 indicating the target problem to the evaluation part 8. While the input/output part 6 receives/outputs the signals from/to the cellular automata 2a, 2b and 2c, it is necessary to input/output information as to the target problem with respect to specific cells, in more detail. In more concrete terms, therefore, required is a network interconnecting the input/output part 6 with the specific cells, for example. In this case, therefore, the signal 7 indicating the target problem and the signals 9a, 9b and 9c indicating the output results of the cellular automata 2a, 2b and 2c may be directly inputted in the evaluation part 8, without through the input/output part 6.

As to the operations of the growth period state deriving unit 4, the stable period state deriving means 5 and the input/output part 6, the stable period state deriving unit 5 and the input/output part 6 may start the operations after completion of the operations of the growth period state deriving unit 4, or all of the growth period state deriving unit 4, the stable period state deriving unit 5 and the input/output part 6 may operate at the same time, for example.

Since the growth period state deriving unit 4 and the stable period state deriving unit 5 are provided every cell, the stable period state deriving unit 5 may start operations at different times between the cells.

Further, the growth period state deriving means 4 and the stable period state deriving unit 5 may be provided every cellular automaton.

Then, the evaluation part 8 calculates degrees of application indicating to what degrees the cellular automata 2a, 2b and 2c apply to the target problem, on the basis of the signal 7 indicating the target problem and the signals 9a, 9b and 9c indicating the output results of the cellular automata 2a, 2b and 2c. These degrees of application are inputted as evaluation values in the evaluation reflecting part 11, which in turn decides next initial states of the respective cellular automata 2a, 2b and 2c and next operations of the growth period state deriving unit 4 and the stable period state deriving unit 5, and outputs the signals 12 indicating the same to the respective cellular automata 2a, 2b and 2c.

Figure 14:
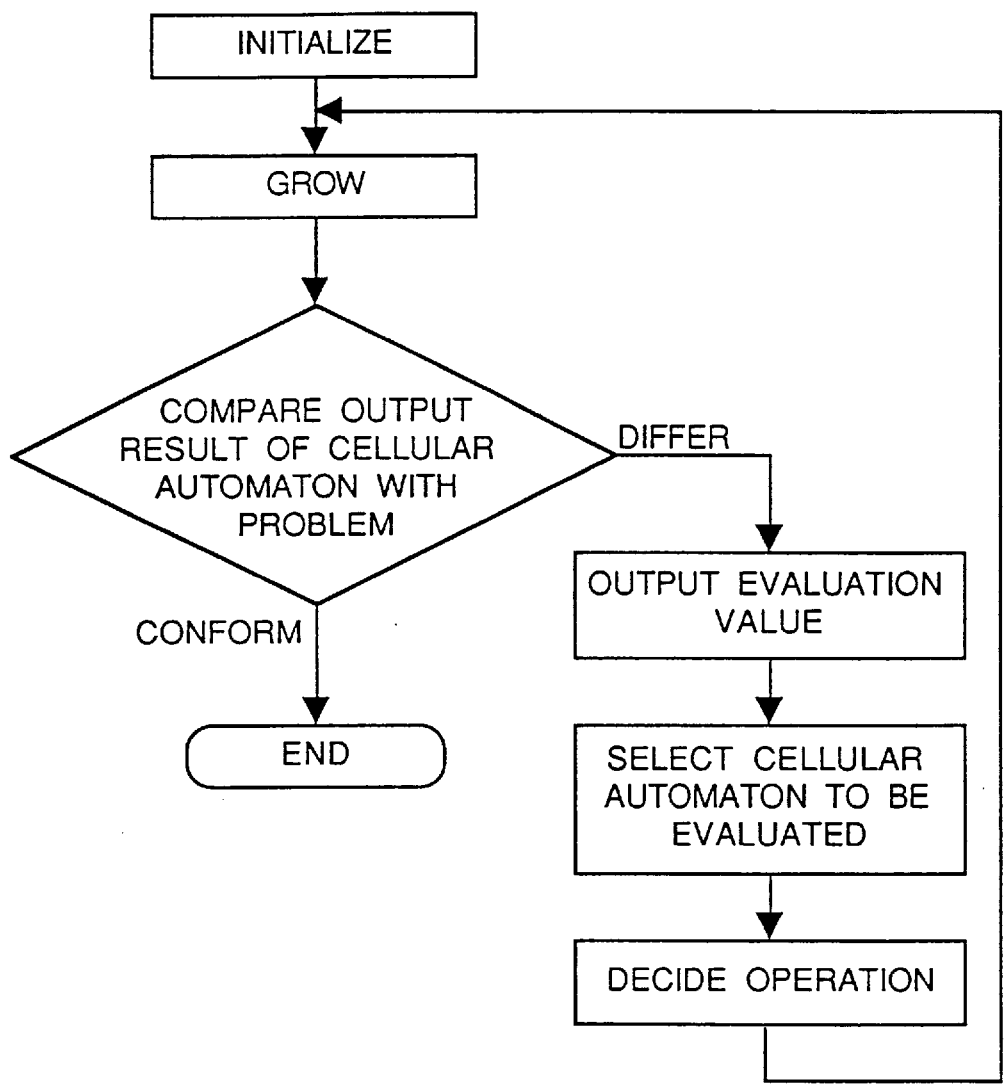
FIG. 14 is a flow chart for illustrating an operation of a genetic algorithm in the embodiment of the present invention.

FIG. 14 is a flow chart for illustrating a genetic algorithm.

Referring to FIG. 14, the genetic algorithm is now described. It is assumed that the cellular automata 2a, 2b and 2c are first set in initial states having large degrees of difference with respect to the target problem. The cellular automata 2a, 2b and 2c which are set in initial states having large differences are brought into certain growth states by the growth period state deriving unit 4 and the stable period state deriving unit 5 respectively. The evaluation part 8 compares the signals 9a, 9b and 9c indicating the output results of the cellular automata 2a, 2b and 2c which are brought into the certain states with the signal 7 indicating the target problem, and inputs the signals 10 indicating the evaluation values in the evaluation reflecting part 11. The evaluation reflecting part 11 selects two cellular automata to be evaluated, and decides initial states of the cellular automata 2a, 2b and 2c and operations of the growth period state deriving unit 4 and the stable period state deriving unit 5 on the basis thereof. In this decision, the evaluation reflecting part 11 sets initial states of remaining cellular automata etc. on the basis of the initial state of the cellular automaton to be most evaluated and the operations of the growth period state deriving unit 4 and the stable period state deriving unit 5, in states slightly different from the same.

Then, processes of growing and stabilizing the respective cellular automata are again carried out. Such processes are so repeated that the considerable differences between the initial states of the cellular automata with respect to the target problem are gradually reduced to be applicable to the target problem.

Due to employment of the aforementioned genetic algorithm, it is possible to carry out parallel operations of about $N^3$ (N: number of the cellular automata) potentially caused in the genetic algorithm, so that the neural network is quickly applicable to the target problem.

Figure 15:
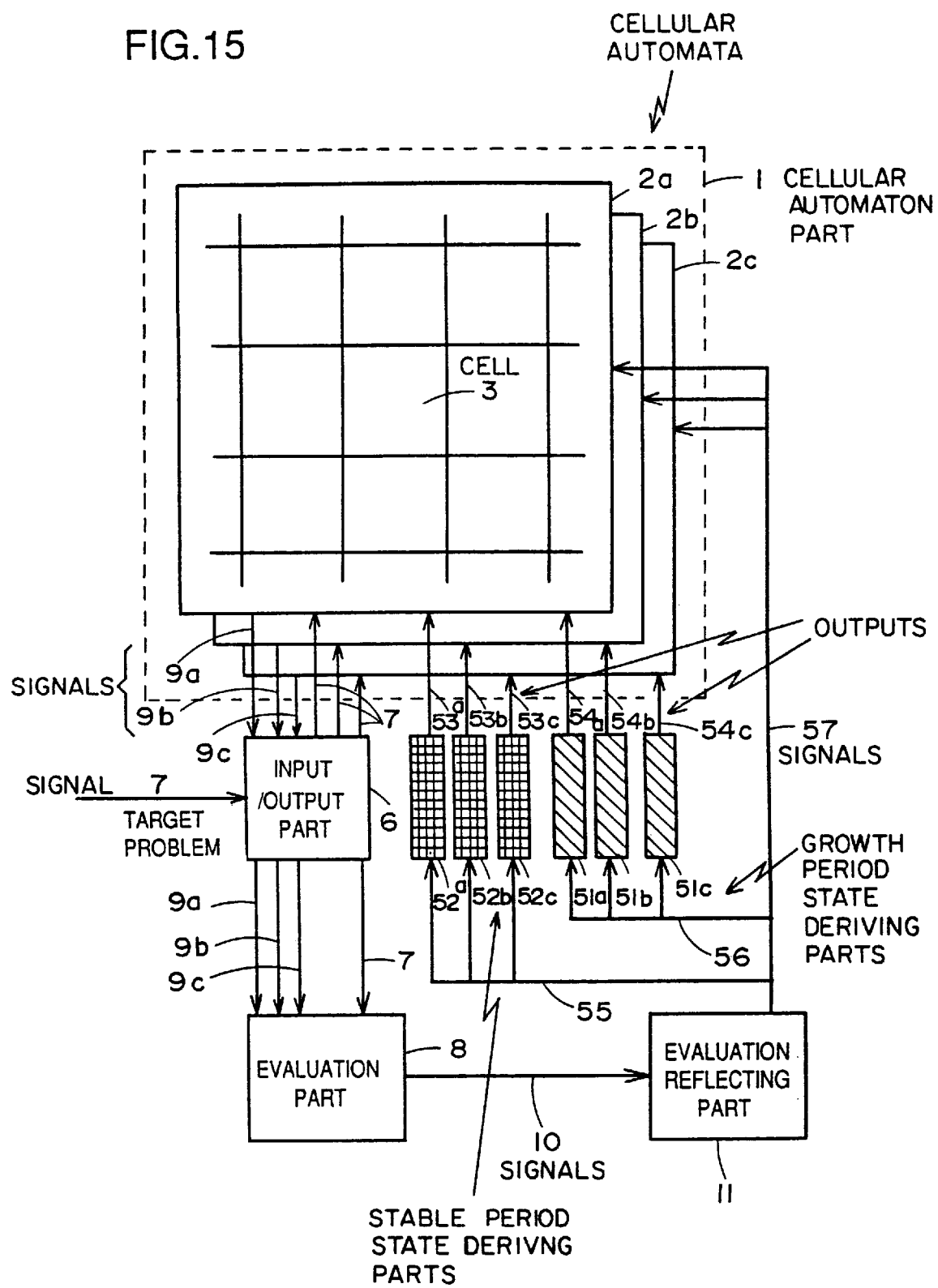
FIG. 15 is a schematic block diagram showing an optimizer employing neuronic cellular automata according to another embodiment of the present invention.
Figure 16:
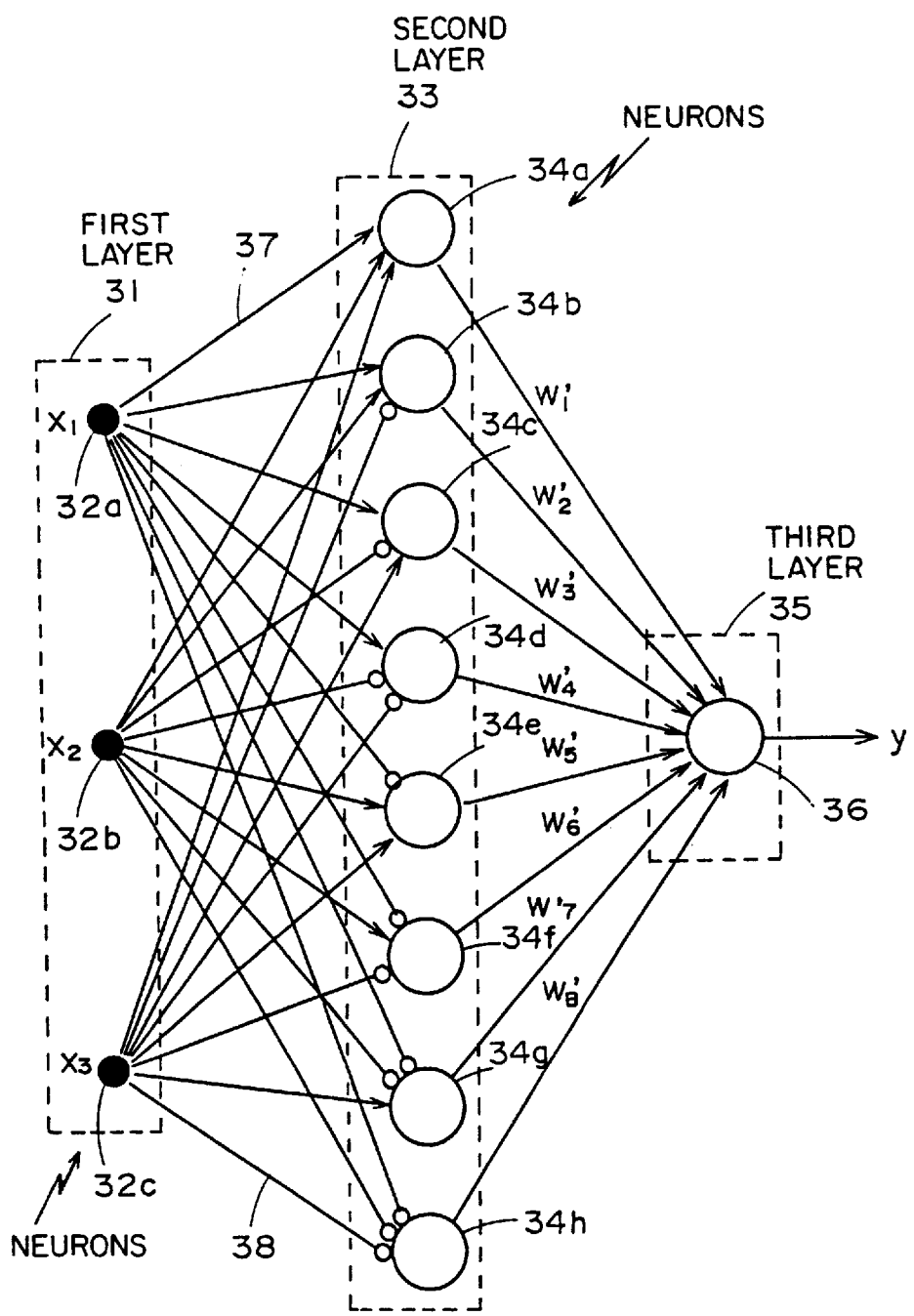
FIG. 16 illustrates a concrete example of a conventional hierarchical neural network.
Figure 17:
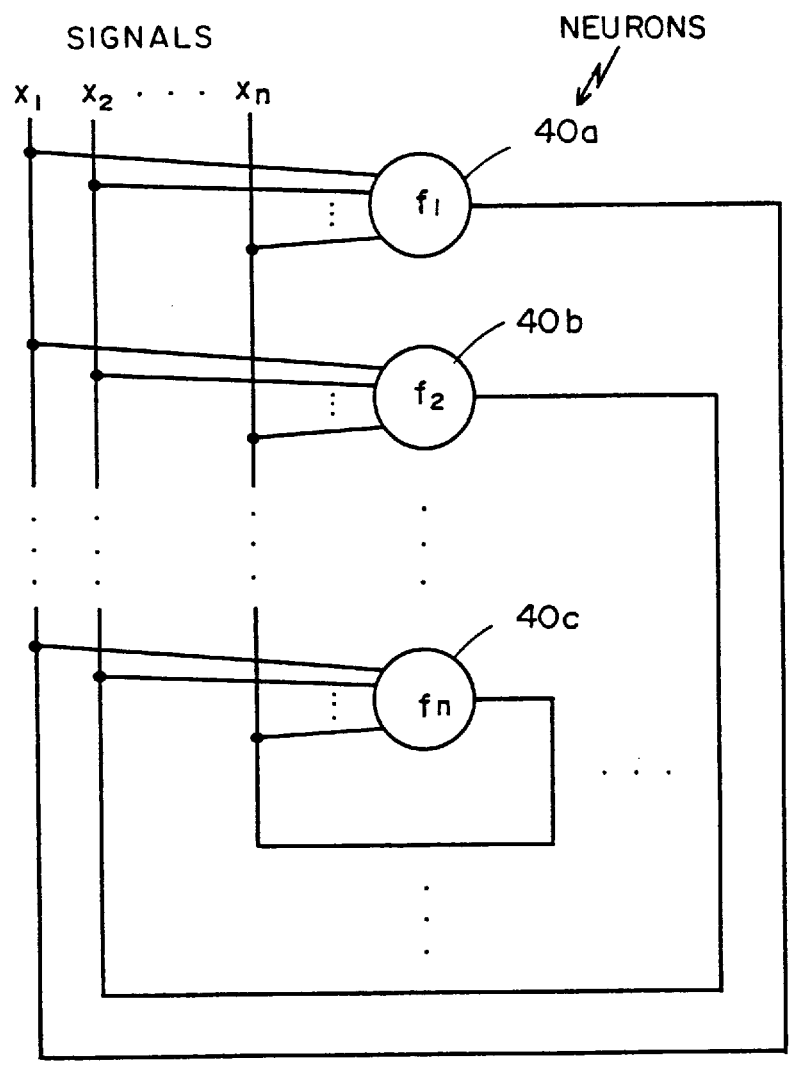
FIG. 17 illustrates a concrete example of a conventional interconnecting neural network.

FIG. 15 is a schematic block diagram showing an optimizer employing neuronic cellular automata according to another embodiment of the present invention. Referring to FIG. 15, description is made only on points of this embodiment which are different from those shown in FIG. 1.

In the embodiment shown in FIG. 1, the growth period state deriving unit 4 and the stable period state deriving unit 5 are provided every cell 3 of the cellular automata 2a, 2b and 2c. In the embodiment shown in FIG. 15, on the other hand, growth period state deriving parts 51a, 51b and 51c corresponding to the growth period state deriving unit 4 are provided in the exterior of a CA part 1, so that outputs 54a, 54b and 54c thereof are inputted in respective ones of cellular automata 2a, 2b and 2c. Further, stable period state deriving parts 52a, 52b and 52c corresponding to the stable period state deriving unit 5 are also provided in the exterior of the CA part 1, so that outputs 53a, 53b and 53c thereof are inputted in the respective ones of the cellular automata 2a, 2b and 2c. Following such provision of the growth period state deriving parts 51a, 51b and 51c and the stable period state deriving parts 52a, 52b and 52c in the exterior of the CA part 1, an evaluation reflecting part 11 inputs signals 57 for setting next initial states in the respective ones of the cellular automata 2a, 2b and 2c as well as signals 56 and 55 for setting next operations of the growth period state deriving parts 51a, 51b and 51c and the stable period state deriving parts 52a, 52b and 52c in the same respectively.

A different portion of the operation is now described. First, the growth period state deriving parts 51a, 51b and 51c supply the outputs 54a, 54b and 54c such as light which can provide a prescribed rule to the respective cellular automata 2a, 2b and 2c, whereby the cellular automata 2a, 2b and 2c start to be grown. After the cellular automata 2a, 2b and 2c are grown to some extent, the stable period state deriving parts 52a, 52b and 52c generate the outputs 53a, 53b and 53c such as light which can similarly provide a prescribed rule to stabilize the same. When the stable period state deriving parts 52a, 52b and 52c supply the outputs 53a, 53b and 53c to the cellular automata 2a, 2b and 2c, an input/output part 6 simultaneously starts its operation similarly to that in the first embodiment shown in FIG. 1.

Thereafter an operation similar to that of the embodiment shown in FIG. 1 is carried out so that the evaluation reflecting part 11 decides next initial states of the cellular automata 2a, 2b and 2c and outputs the signals 57 indicating the states to the same respectively. The evaluation reflecting part 11 also sets next operations of the growth period state deriving parts 51a, 51b and 51c and outputs the signals 56 indicating the operations to the same respectively, while setting next operations of the stable period state deriving parts 52a, 52b and 52c and outputting the signals 55 indicating the operations to the same respectively. Then, the growth period state deriving parts 51a, 51b and 51c generate the outputs 54a, 54b and 54c such as light to the cellular automata 2a, 2b and 2c respectively, to repeat the aforementioned operation.

Under such repetition, the evaluation reflecting part 11 optimizes the cellular automata 2a, 2b and 2c provided in the CA part 1 through a genetic algorithm, similarly to the embodiment shown in FIG. 1.

While the growth period state deriving unit 4 and the stable period state deriving unit 5 are provided in each of the cellular automata 2a, 2b and 2c in the embodiment shown in FIG. 1 and the growth period state deriving parts 51a, 51b and 51c and the stable period state deriving parts 52a, 52b and 52c are provided in the exterior of the CA part 1 in the embodiment shown in FIG. 15, parts of these means may be provided in the exterior so that the remaining parts are provided in the exterior. In other words, the growth period state deriving unit 4 and the stable period state deriving unit 5 may be provided in the interior of the cellular automaton 2a while the growth period state deriving part 51b and the stable period state deriving part 52b may be provided in the exterior of the cellular automaton 2b, for example.

Further, the growth period state deriving unit 4 may be provided in the interior and the stable period state deriving part 52a may be provided in the exterior respectively in relation to a single cellular automaton.

While the cells are so interconnected with each other that the next states thereof are decided by the signals of nearby cells and those of the cells themselves as shown in FIG. 2 for deriving states of the cellular automata 2a, 2b and 2c provided in the first embodiment, this will not inhibit the respective cells of the cellular automata from partially having input/output connections with remote cells or the exterior.

Although the cellular automata are provided with two-dimensionally arranged cells in the aforementioned embodiments, the cells may alternatively be arranged in three or more dimensions.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cellular automaton provided with a plurality of cells being so interconnected with each other that signals indicating states of nearby cells can be input in respective said cells as input signals, comprising:

each said cell includes growth period state deriving means for progressing state propagation signals in said cell with reference to a prescribed rule, holding loci of progress thereof as held signal propagation paths and stopping progress of those of said state propagation signals having heads colliding with each other, and stable period state deriving means adding new signals to starting points of said held signal propagation paths for propagating said loci of progress toward head sides as propagated loci of progress, and changing other state propagation signals by head signals of said propagated loci of progress, thereby stabilizing said cellular automaton.

2. The cellular automaton according to claim 1, wherein said growth period state deriving means includes:

progress means for progressing said state propagation signals while directly propagating, deflecting or branching the same from starting points of selected prescribed said cells, holding means for holding signal loci of said state propagation signals being progressed by said progress means as signal propagation paths, and stop means for stopping progress of those of said state propagation signals having heads colliding with said signal propagation paths being held by said holding means.

3. The cellular automaton according to claim 1, wherein said growth period state deriving means includes:

propagation means for adding new signals to said cells in said signal propagation paths as formed, thereby propagating signal loci of said state propagation signals, and change means for changing other state propagation signals by heads of said state propagation signals being propagated by said propagation means.

4. The cellular automaton according to claim 1, wherein said growth period state deriving means and said stable period state deriving means are provided in the interior or the exterior of each said cell in said cellular automaton.

5. An optimizer employing a neuronic cellular automaton having a plurality of cells being interconnected with each other, said optimizer comprising:

a cellular automaton part being provided with said neuronic cellular automaton;

growth period state deriving means for progressing state propagation signals from starting points of prescribed said cells of said neuronic cellular automaton provided in said cellular automaton part, holding loci of progress thereof as signal propagation paths, forming colliding said cells of said signal propagation paths as operation parts and stopping progress of those of said state propagation signals having said colliding heads, thereby growing said neuronic cellular automaton;

stable period state deriving means adding new signals to said starting points of said held signal propagation paths for propagating said loci of progress toward head sides and changing other state propagation signals by head signals of propagated said loci of progress in said operation parts, thereby stabilizing said neuronic cellular automaton;

an input/output part outputting a target problem to said neuronic cellular automaton of said cellular automaton part and receiving an output result of said neuronic cellular automaton being responsive thereto;

an evaluation part comparing said target problem with said output result of said neuronic cellular automaton for calculating an evaluation value being a degree of application of said neuronic cellular automaton to said target problem; and an evaluation value reflecting part for deciding a next initial state of said neuronic cellular automaton in said cellular automaton part and next operations of said growth and stable period state deriving means on the basis of said evaluation value being calculated in said evaluation part and inputting respective signals indicating the same in said neuronic cellular automaton, said growth period state deriving means and said stable period state deriving means.

6. An optimizer in accordance with claim 5, wherein said cellular automaton part has a plurality of said neuronic cellular automata, said evaluation value reflecting part employing a genetic algorithm.

* * * * *